United States Patent
Hajianpour et al.

(10) Patent No.: US 8,091,277 B1
(45) Date of Patent: Jan. 10, 2012

(54) PLANT CONTAINER HAVING AN ELONGATED MEMBER FOR ATTACHMENT WITHIN THE GROUND AND METHOD FOR USE THEREOF

(75) Inventors: Zoya Hajianpour, Fort Lauderdale, FL (US); Bashareh Arta Sabouni, Staton Island, NY (US)

(73) Assignee: Zoya, Inc., Fort Lauderdale, FL (US)

( * ) Notice: Subject to any disclaimer, the term of this patent is extended or adjusted under 35 U.S.C. 154(b) by 39 days.

(21) Appl. No.: 12/589,066

(22) Filed: Oct. 16, 2009

Related U.S. Application Data

(63) Continuation-in-part of application No. 11/185,101, filed on Jul. 20, 2005, now abandoned.

(51) Int. Cl.
*A01G 9/02* (2006.01)
(52) U.S. Cl. .............. 47/65.5; 47/41.14; 47/65; 47/66.7
(58) Field of Classification Search ............ 47/41.1, 47/41.01, 41.14, 41.15, 65, 65.5, 66.7, 39, 47/65.6; 248/7.8, 530, 156, 545; D11/143–154; 285/394, 396, 401, 402
See application file for complete search history.

(56) References Cited

U.S. PATENT DOCUMENTS

| | | | | |
|---|---|---|---|---|
| 7,318 A | * | 4/1850 | Brown | 285/396 |
| 974,897 A | * | 11/1910 | Ljunggren | 109/72 |
| 1,831,308 A | | 6/1929 | Kuck | |
| 1,955,285 A | * | 4/1934 | Graham | 439/672 |
| 2,482,278 A | * | 9/1949 | Koerner | 248/156 |
| 2,733,549 A | * | 2/1956 | Moore | 47/41.01 |
| 3,345,774 A | | 10/1967 | Delbuguet | |
| D221,971 S | * | 9/1971 | Terrell | D11/153 |
| 3,611,633 A | * | 10/1971 | Shackelford | 47/78 |
| 4,057,931 A | | 11/1977 | Stutelberg et al. | |
| 4,658,541 A | | 4/1987 | Haile | |
| 4,890,417 A | | 1/1990 | Futch et al. | |
| 5,279,072 A | | 1/1994 | Garbo | |
| 5,852,895 A | * | 12/1998 | Sinanan | 47/33 |
| 6,035,576 A | | 3/2000 | Bozeman | |
| 6,149,119 A | * | 11/2000 | O'Connell | 248/545 |
| D460,020 S | * | 7/2002 | Fan | D11/152 |
| D485,510 S | * | 1/2004 | Fan | D11/152 |
| 6,783,023 B1 | | 8/2004 | Fan | |
| 2004/0177553 A1 | * | 9/2004 | Harbaugh | 47/65.6 |

* cited by examiner

*Primary Examiner* — Andrea Valenti
(74) *Attorney, Agent, or Firm* — Ronald V. Davidge

(57) ABSTRACT

A container for plants includes an integral structure having a bottom wall, a side wall extending upward to an edge forming an open top, and an elongated member extending downward from an opening in the bottom wall for attachment of the container to the soil of a garden. In one version, the elongated member is removably attached to the container, and a plug is provided for the opening, so that the container can be placed on a flat surface for displaying a plant that is later placed in a garden area in the container with the elongated member extending into the soil.

6 Claims, 4 Drawing Sheets

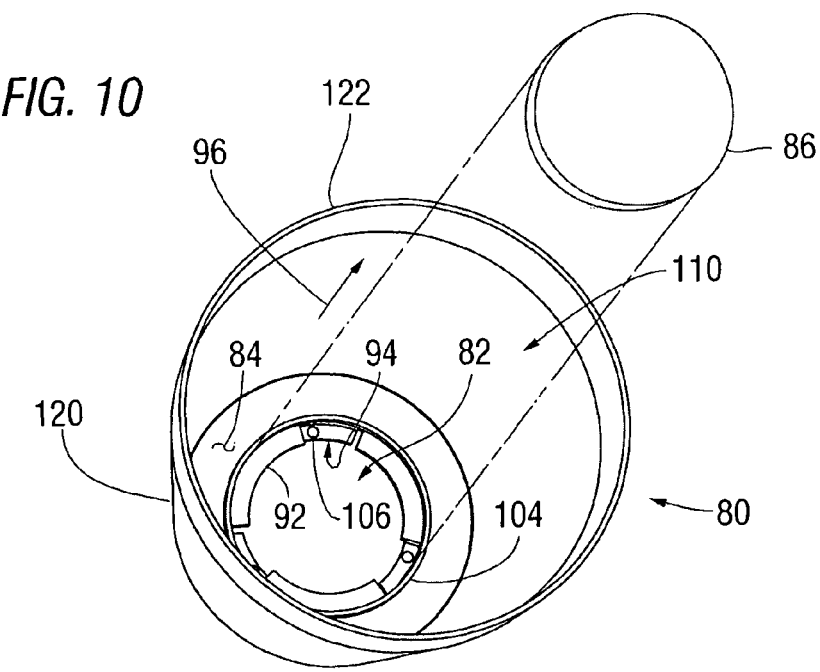
FIG. 10
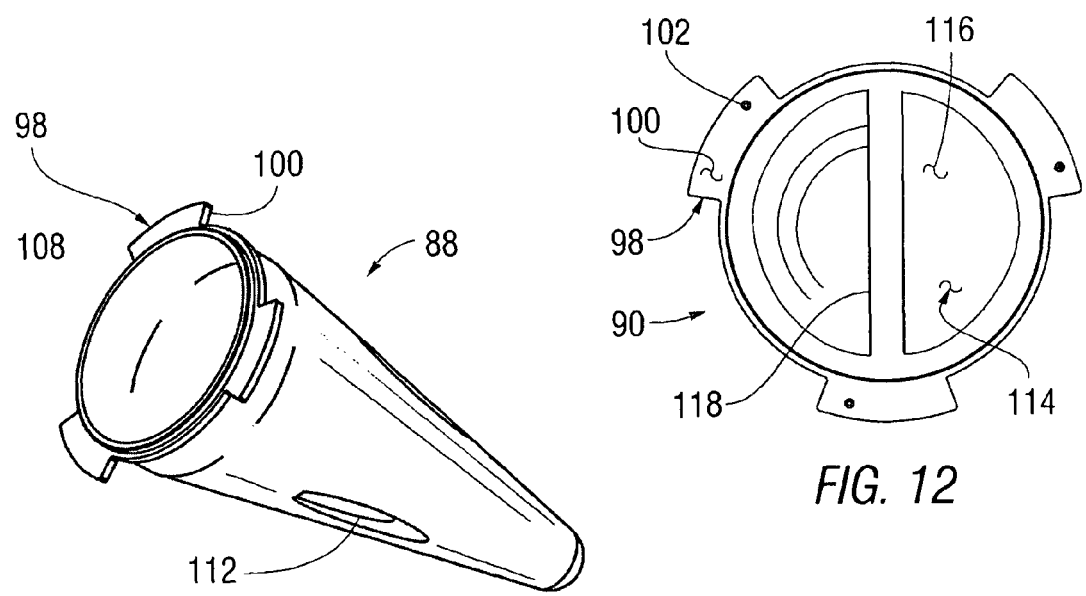
FIG. 11
FIG. 12

PLANT CONTAINER HAVING AN ELONGATED MEMBER FOR ATTACHMENT WITHIN THE GROUND AND METHOD FOR USE THEREOF

CROSS REFERENCE TO A RELATED APPLICATION

This application is a continuation-in-part of U.S. application Ser. No. 11/185,101, filed Jul. 20, 2005 now abandoned.

BACKGROUND OF THE INVENTION

1. Field of the Invention

This invention relates to containers for flowers and other plants, and, more particularly, to containers for use in the display of plants for sale and later in forming a garden.

2. Summary of the Background Art

For many years, pots for flowers and other plants have been made using clay and ceramic materials in a variety of sizes and shapes. Generally, such pots are stackable when empty. The familiar tapered shape of flower pots is probably a result of an ancient need to provide stackability, so that a large number of pots could be stored and sold within a relatively small area. Thus, a conventional flower pot, being composed of a fired clay or ceramic material, has a tapered shape, an open top, and a bottom surface including a central drain hole, through which excessive water added to the pot is drained. Similar pots are injection molded using thermoplastic resins, often resulting in a color and appearance similar to that of a clay pot.

However, many conventional pots are so small that, even when they are filled with dirt, they are easily turned over or moved out of position, particularly limiting their usefulness in outdoor gardens, where wind, rain, and passing animals can easily move or overturn the pots. Thus, what is needed is a pot that can be fastened into place on an underlying soil surface by an integral feature of the pot.

U.S. Pat. No. 6,035,576 describes an apparatus for holding potted plants with enhanced stability, with the apparatus including a pole or standard and a baseplate. The pole is passed through a hole in a square baseplate, which conforms to the shape of the pole, with the pole being releasably coupled to the baseplate. The baseplate is secured or attached to the ground by flanges formed by the corners of the baseplate. Thus, the baseplate acts to support or stabilize the pots when the apparatus is subjected to adverse environmental conditions. In one embodiment, a receptacle, which may be shaped to hole a pot in turn holding a plant, is shown, with the receptacle being held above the ground on the top of the pole. What is needed is a container for a plant including a bottom wall configured to be placed on the surface of the ground and a downward-extending attachment member, formed as an integrated part of the container and extending downward from the bottom wall, so that the container can be placed directly on the ground and attached to the ground without the need for a separate pole, retainer, and baseplate.

U.S. Pat. No. 4,890,417 describes an elongated member having one arcuate shaped edge and, on the opposite side a straight edge, which may be used to plant vegetative matter on a bank or hill. The elongated member is curved into a semicircle and held in place by spikes so that a planting hole may be formed on the uphill side thereof. Again, what is needed is a container for a plant that includes a bottom wall, a side wall, and an integrated elongated attachment member extending downward from the bottom wall.

Other patents describe plant containers including interlocking surfaces used to attach the containers to one another. For example, U.S. Pat. No. 4,658,541 describes a planter or flower pot construction in which approximately semicircular planters are arranged in horizontal courses, with the planters of each course being staggered in respect to those of the next lower course. The back walls of the planters, at top and bottom, are provided with alternating teeth and notches, adapted to interlock with the teeth and notches of the next upper and lower courses. U.S. Pat. No. 4,057,031 describes a molded stackable flower pot provided with an annular rim adjacent the bottom thereof, with the rim supporting the pot so that the bottom surface of the pot is spaced upwardly from a surface supporting the pot. The rim has a plurality of apertures defined therein, positioned so that the apertures will receive peripheral upper edge portions of two other similar flower pots so that pots can be supported in a stacked and interlocked relationship to each other.

SUMMARY OF THE INVENTION

In accordance with one aspect of the invention, a container for plants is provided. The container for plants includes a circular bottom wall, a side wall, and an elongated hollow member, is provided. The side wall extending around the circular bottom wall and upward to a circular edge extending around an open top. The elongated hollow member, which is tapered toward a distal point, extends downward from the bottom wall.

Preferably, the elongated hollow member is removably attached to the circular bottom wall, which includes a central hole extending above the elongated hollow member and a plug for removable attachment adjacent to the central hole. For example, the circular bottom wall may include a number of positioning segments and a number of attachment segments, each extending into the central hole, while the elongated hollow member includes an upper end having a number of attachment tabs extending outward. Then, the elongated hollow member is attached to the circular bottom wall by first moving the elongated member upward from below the circular bottom wall so that the attachment tabs contact the attachment segments, and by then rotating the elongated hollow member relative to the circular bottom wall into an attached portion, moving the attachment tabs into gaps between the positioning segments and the attachment segments.

Preferably, provisions are made for stacking a number of the containers inside one another, with the bottom wall being smaller than the open top, and with the side wall being tapered between the open top and the bottom wall. Both the bottom wall and the elongated member may include drain holes. One side of the elongated member may be flat to facilitate alternative attachment of the container to a vertical surface.

In accordance with another aspect of the invention a garden includes a soil surface having a number of elongated holes, and a number of the integral containers, with the elongated member of each of the containers extending into one of the elongated holes to attach the container to the soil surface.

In accordance with yet another aspect of the invention, a method for distributing plants and forming a garden is provided. The method includes receiving a number of containers having a central hole in a bottom wall blocked by a plug and a like number of hollow elongated members; placing a plant in each of the containers; moving one or more of the containers and one or more of the elongated members to a garden area'; removing the plug from each of the container(s) moved to the garden; attaching one of the hollow elongated members to each of the containers moved to the garden to extend

BRIEF DESCRIPTION OF THE DRAWINGS

FIG. 10 is a perspective view of a container built in accordance with a fourth embodiment of the invention, shown in an exploded relationship with a plug for filling a bottom hole within the container;

FIG. 11 is a perspective view of a removable elongated member for attachment to the container of FIG. 11;

FIG. 12 is a fragmentary bottom plan view of an alternative plug for filling the bottom hole within the container of FIG. 10.

DETAILED DESCRIPTION OF THE INVENTION

Figure 1:
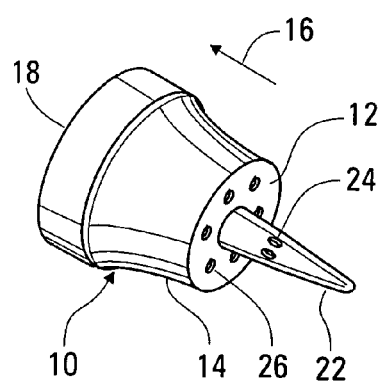
FIG. 1 is a perspective view of a container for plants built in accordance with a first embodiment of the invention, shown lying on a side thereof.
Figure 2:
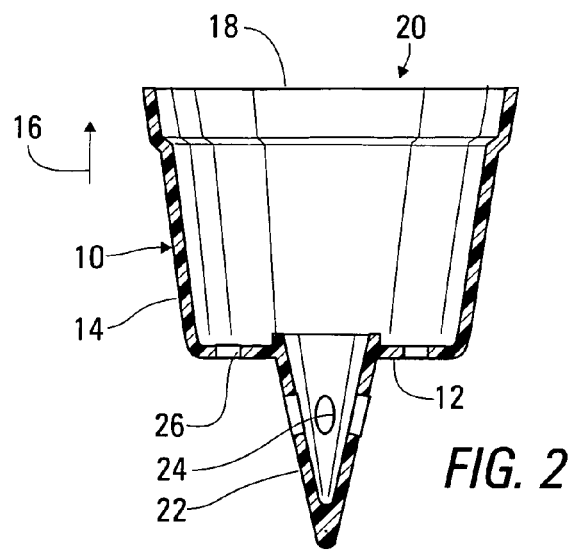
FIG. 2 is a cross-sectional elevation of the container of FIG. 1.
Figure 3:
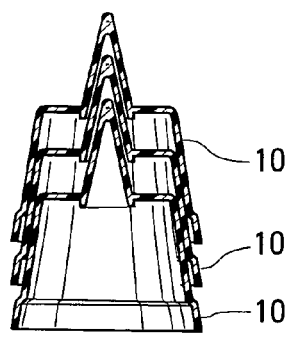
FIG. 3 is a cross-sectional elevation of three of the containers of FIG. 1, stacked in an inverted orientation.

A first embodiment of a container 10 for plants is shown as lying on its side in the perspective view of FIG. 1, while a cross-sectional elevation of this container 10 is shown in FIG. 2. The container 10 includes a circular bottom wall 12 and a side wall 14 extending around the bottom wall 12 and upward, in the direction of arrow 16, to a circular upper edge 18, extending around an open top 20. The container 10 additionally includes an elongated member 22, extending downward, opposite the direction of arrow 16, from the bottom wall 12, for attaching the container 10 within soil. The elongated member 22 is hollow, including a number of drain holes 24, which help to drain excessive moisture within soil filling the container 10. The bottom wall 12 also includes a number of drain holes 26. Preferably, the elongated member 22 is tapered toward a point at a distal end 28, and the bottom wall 12 is smaller than the open top 20, so that a number of empty similar containers 10 can be stacked within one another and stored in an inverted orientation, as shown in FIG. 3. In this way, space can be saved during the storage, distribution, and display for sale of the containers 10.

The container 10 is preferably an integral (one-piece) structure composed of a molded thermoplastic resin, with the side wall 14 and upper edge 18 presenting the general appearance of a conventional pot. The brick red or terra-cotta coloring of a conventional clay pot may be copied in the coloring of the thermoplastic resin.

Figure 4:
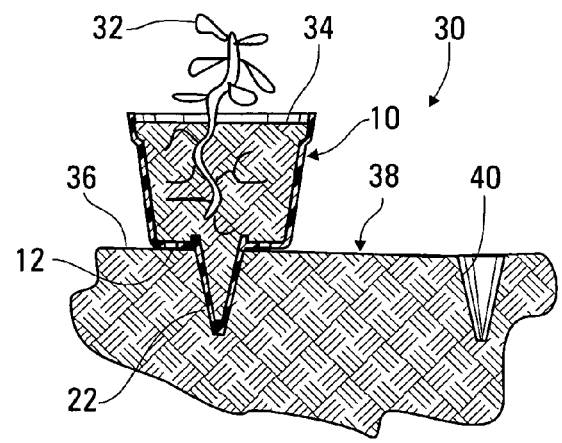
FIG. 4 is a cross-sectional elevation of the container of FIG. 1 as used within a garden.

FIG. 4 is a cross-sectional elevation of the container 10, shown as used in a garden 30, including a number of the containers 10, each holding one or more plants 32, together with soil 34. The containers 10 rest with their bottom walls 12 disposed against the surface 36 of the garden soil 38, and with their elongated members 22 extending downward within holes 40 formed in the garden soil 38.

The garden 30 is planted by filling each of a number of the containers 10 with soil 34 and with plant material, such as plants 32 or seeds (not shown), and by forming a number of the elongated holes 40 within the garden soil 38. The containers 10 are placed with their elongated members 22 extending within the holes 40 and with their bottom walls 12 disposed against the surface 36 of the garden soil 38. For example, the holes 40 may be formed before any of the containers 10 are placed, or a new hole 40 may be formed before each of the containers 10 is placed. If the garden soil 38 is soft enough, the elongated member 22 of a container 10 may be pressed into the soil 38 to form a hole 40. Otherwise, a stake driven by a hammer and subsequently removed for reuse may be used to form the holes 40.

Figure 5:
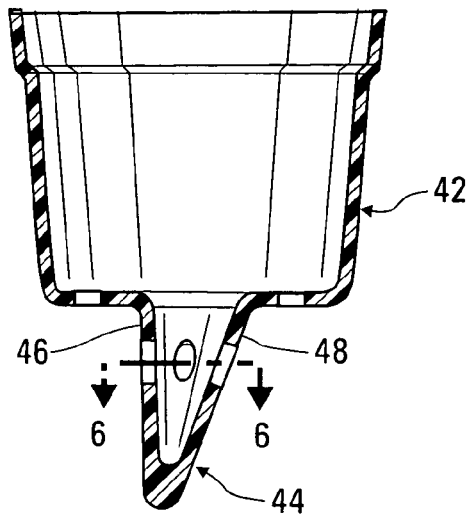
FIG. 5 is a cross-sectional elevation of a container for plants built in accordance with a second embodiment of the invention.
Figure 6:
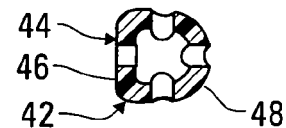
FIG. 6 is a cross-sectional plan view of an elongated member within the container of FIG. 5, taken as indicated by section lines 6-6 therein.

FIGS. 5 and 6 show a container 42 for plants built in accordance with a second embodiment of the invention, with FIG. 5 being a cross-sectional elevation of the container 42, and with FIG. 6 being a cross-sectional plan view of an elongated member 44 forming a portion of the container 42, taken as indicated by section lines 6-6 in FIG. 5. The features of the container 42 are similar to the features of the container 10, as described above in reference to FIGS. 1 and 2, except that the elongated member 44 of the container 42 is differently shaped, having a flat side 46 and a convexly curved side 48.

Figure 7:
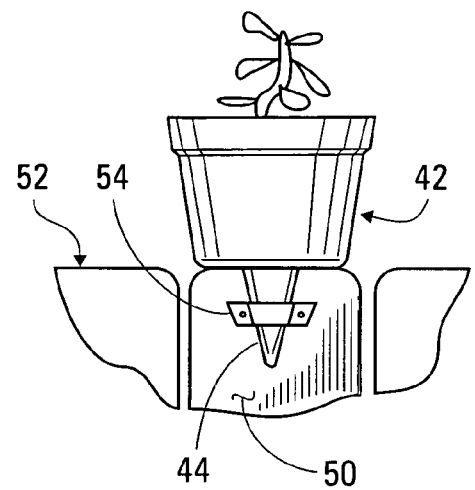
FIG. 7 is an elevation of the container of FIG. 5, showing a use thereof.

As shown in FIG. 7, this configuration allows the container 42 to be fastened to a flat exterior surface 50 such as a side of a fence 52, with the flat side 46 of the elongated member 44 being held against the surface 50 through the use of a bracket 54 attached to the fence 52.

Figure 8:
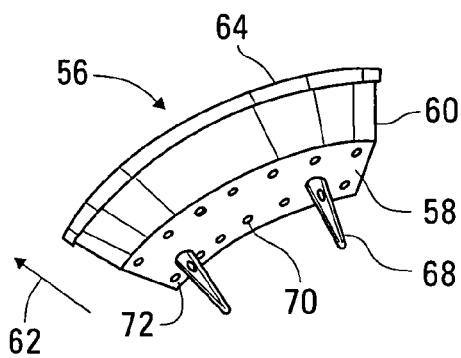
FIG. 8 is a perspective view of a container for plants built in accordance with a third embodiment of the invention, shown lying on edges thereof.
Figure 9:
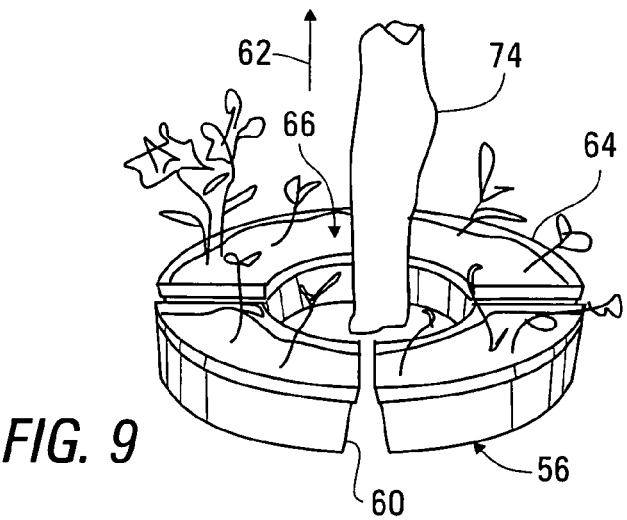
FIG. 9 is a perspective view of four of the containers of FIG. 8, showing a use thereof.

FIG. 8 shows a container 56 for plants built in accordance with a third embodiment of the invention, while FIG. 9 shows four of the containers 56 in use. Each of the containers 56 includes a bottom wall 58 and a side wall 60 extending upward, in the direction of arrow 62, to an upper edge 64, extending around an open top 66. The container 56 also includes two elongated members 68, extending downward, opposite the direction of arrow 62, for attachment of the container 56 within a soil surface. The container 56 also includes a number of drain holes 70 in the bottom wall 58 and a number of additional drain holes 72 in the elongated members 68. The containers 56 are generally shaped as planters configured for placement in a circular pattern around a single object, such as a tree 74. Thus, within each of the containers 56, the bottom wall 58 and the open top 66 formed by the upper edge 64 are each shaped as sections of an annulus, or ring. When an appropriate number of the containers 56 are put together, end-to-end, as shown in FIG. 9, a complete annulus, or ring is formed. Preferably, the bottom wall 58 is smaller than the open top 66, so that similar containers 56 can be stacked in an inverted orientation, generally as shown for the container 10 in FIG. 3.

The method for planting a garden described above in reference to FIG. 4 has an advantage over the method described in the prior art as U.S. Pat. No. 6,035,576 in that the method of the present invention does not require a separate hooked pole or a pole with a receptacle for each plant container, or pot. Instead, in the present invention, the plant container itself includes an elongated member 22 that is used for attaching the container 10 within the soil. Additionally, the method of the present invention results in a number of plant containers, such as pots or planters, that rest with their bottom walls extending along the surface of the ground, instead of being held above the surface of the ground.

A fourth embodiment of the invention will now be discussed, with references being made to FIGS. 10-12. FIG. 10 is a perspective view of a container 80 built in accordance with the fourth embodiment to have a central hole 82 within its circular bottom wall 84, shown in an exploded relationship with a plug 86 provided for filling the central hole 82. FIG. 11 is a perspective view of a removable elongated member 88 provided for attachment within the hole 82 to extend downward from the container 80. FIG. 12 is a bottom plan view of an alternative plug 90 for filling the central hole 82. If either the plug 86 or the alternative plug 90 is installed to fill the central hole 82, the container 80 can be placed on the floor, on the ground, or on a shelf to display a plant therein without a need to provide a hole under the container 80 to accept the elongated member 88.

As shown in FIG. 10, the container 80 includes a plurality of positioning segments 92 and a number of attachment segments 94 extending inward, into the central hole 82. The positioning segments 92 are disposed upwardly, in the direction of arrow 96, and spaced apart from, the attachment segments 94. As shown in FIGS. 11 and 12, both the removable elongated member 88 and the alternative plug 90 have a plurality of outwardly extending attachment tabs 98, each of which has a lower surface 100 including a detent bump 102.

The plug 86 is pressed into place within a ridge 104 extending upward from the circular bottom wall 84 and around the central hole 82, and is removed by being pushed upward, through the central hole 82. The removable elongated member 88 and the alternative plug 90 are each alternatively installed on the container 80 by being moved upward within the central hole 82 from below the container 80, with their attachment tabs 98 aligned with the positioning segments 92 of the container 80, until contact is made between their attachment tabs 98 and the positioning segments 92. Then, the removable elongated member 88 or the alternative plug 90 is rotated to bring its attachment tabs 98 into positions extending between the spaced apart attachment segments 94 and the positioning segments 92 of the container 80, with the detent bumps 102 of the attachment tabs 98 resting within concave detent surfaces 106 of the attachment segments 94 within the container 80. The removable elongated member 88 or the alternative plug 90 may then be removed from the container 80 by reversing this process, through rotation so that the attachment tabs 98 are moved out of contact with the attachment segments 92, followed by pulling the removable elongated member 88 or the alternative plug 90 downward, away from the container 80.

As shown in FIG. 11, the removable elongated member 88 is hollow, with an opening 108 facing upward into the space 110 within the container 80 when the removable elongated member 88 is attached to the container 80. This arrangement allows excess water from the container 80 to drain downward, through drain holes 112 in the removable elongated member 88. As shown in FIG. 12 the lower surface 114 of the alternative plug 90 includes a concave surface 116 extending along each side of a central ridge 118, allowing the central ridge 118 to be grasped to facilitate handling and rotating the alternative plug 90. A circular side wall 120 of the container 80 extends upward from the circular bottom wall 84 to a circular upper edge 122, being tapered so that a number of the containers 80, with either the plug 88 or the alternative plug 90, may be nested and stacked. The elongated member 88 is hollow and tapered so that a number of the elongated members 88 may be nested and stacked, and so that a number of the containers 80 with attached elongated members 88 may be nested and stacked.

Figure 13:
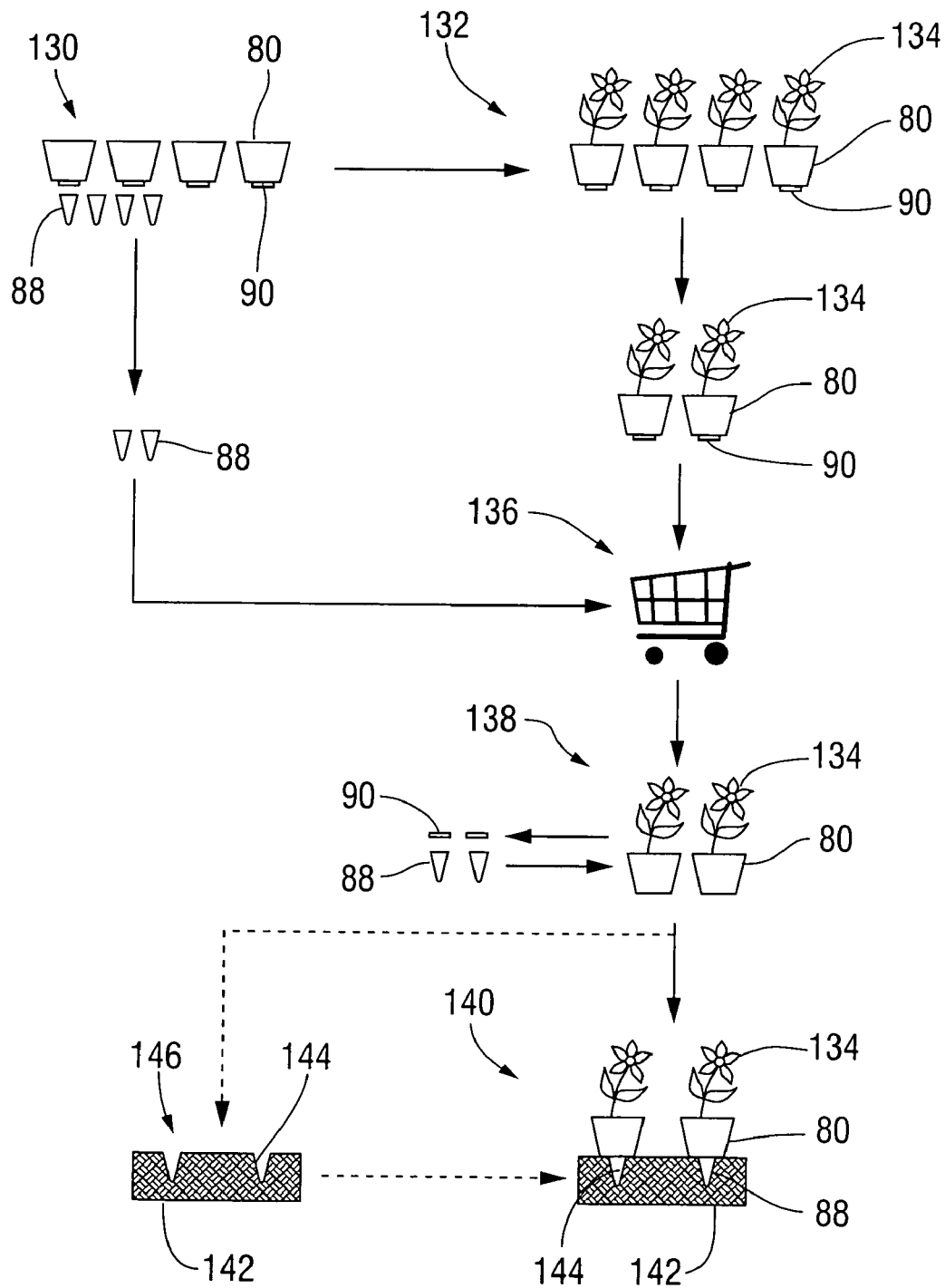
FIG. 13 is a flow chart showing a process for using the container of FIG. 10.

FIG. 13 is a flow chart showing a process for using the container 80, preferably with the alternative plug 90 to display, distribute, and plant a number of plants. First, in step 130, a plant retailer, such as a nursery of a flower shop, receives a number of containers 80, preferably fitted with alternative plugs 90, together with an equal number of elongated members 88. Next, in step 132, a number of plants 134 are placed in the containers 80. These plants 134 may be grown from seeds or smaller plants within the containers 80, or they may be transplanted into the containers 80 from a growing area. Since these containers 80 are assembled with the alternative plugs 90, they may be displayed on a flat surface, such as a shelf or table. Then, in step 136, a shopper select one or more of the plants 134, which are retained in the container 80, and additionally receives an equal number of the elongated members 88. Next, in step 138, before planting the plants, the alternative plugs 90 are removed, and the elongated members 88 are attached to the containers 80. Since the alternative plugs 90 can be removed, and the elongated members 88 can be installed, from below the containers 80, this step is performed without a need to remove the plants 134 from the containers 80. Finally, in step 140, the containers 80, holding the plants 134, are placed on a soil surface 142, with the elongated members 88 extending within holes 144. If the soil surface 142 is soft enough, the elongated members 88 are pressed into place by pressing downward on the containers 80. Otherwise, in optional step 146, the holes 144 are formed within the soil surface 142 before placing the containers 80 on the soil surface 142.

While the invention has been described in its preferred embodiments with some degree of particularity, it is understood that this description has been given only by way of example, and that many variations in form can be achieved without departing from the spirit and scope of the invention, as described in the appended claims.

What is claimed is:
1. A container for plants including:
   a circular bottom wall, including a central hole, a plurality of positioning segments extending into the central hole, and a plurality of attachment segments extending into the central hole, wherein the positioning segments are upwardly displaced and spaced apart from the attachment segments;
   a side wall extending around the circular bottom wall and upward to a circular upper edge extending around an open top; and
   an elongated hollow member, tapered toward a point at a distal end, extending downward from a center of the bottom wall for attaching the container within soil extending downward from the bottom wall, wherein a space within the elongated hollow member is open to a space surrounded by the side wall, wherein the elongated hollow member includes an upper end having a plurality of attachment tabs extending outward, and wherein the elongated hollow member is removably attached to the circular bottom wall by moving the elongated hollow member upward so that the attachment tabs contact the attachment segments, and by then rotating the elongated hollow member relative to the circular bottom wall into an attached position, with the attach- ment tabs moving into gaps between the positioning segments and the attachment segments.

2. The container of claim 1, additionally including at least one detent bump moving into a concave detent surface as the elongated hollow member is rotated relative to the bottom wall into the attached position.

3. The container of claim 1, wherein the elongated member includes at least one drain hole.

4. The container of claim 1, additionally comprising a plug for attachment to close the central hole, wherein
the plug includes a plurality of attachment tabs extending outward, and
the plug is attachable to the circular bottom wall by moving the elongated hollow member upward so that the attachment tabs contact the attachment segments, and by then rotating the elongated hollow member relative to the circular bottom wall into an attached position, with the attachment tabs moving into gaps between the positioning segments and the attachment segments.

5. A garden comprising a soil surface including a plurality of elongated holes, and a plurality of containers holding plants, wherein each of the containers comprises an integral structure including:
a circular bottom wall extending along the soil surface, wherein the circular bottom wall includes a central hole, a plurality of positioning segments extending into the central hole, and a plurality of attachment segments extending into the central hole, wherein the positioning segments are upwardly displaced and spaced apart from the attachment segments;
a circular side wall extending around the circular bottom wall and upward to a circular upper edge extending around an open top; and
an elongated member, tapered toward a point at a distal end, extending downward from a center of the bottom wall into one of the elongated holes to attach the container to the soil surface with the bottom wall of the container extending along the soil surface, wherein the elongated hollow member includes an upper end having a plurality of attachment tabs extending outward, wherein the elongated hollow member is attached to the circular bottom wall by moving the elongated hollow member upward so that the attachment tabs contact the attachment segments, and by then rotating the elongated hollow member relative to the circular bottom wall into an attached position, with the attachment tabs moving into gaps between the positioning segments and the attachment segments, and wherein the container includes an integral soil-filled region extending within the circular side wall and within the hollow elongated member.

6. The garden of claim 5, additionally including at least one detent bump moving into a concave detent surface as the elongated hollow member is rotated relative to the bottom wall into the attached position.

\* \* \* \* \*